United States Patent Office 2,818,535
Patented Dec. 31, 1957

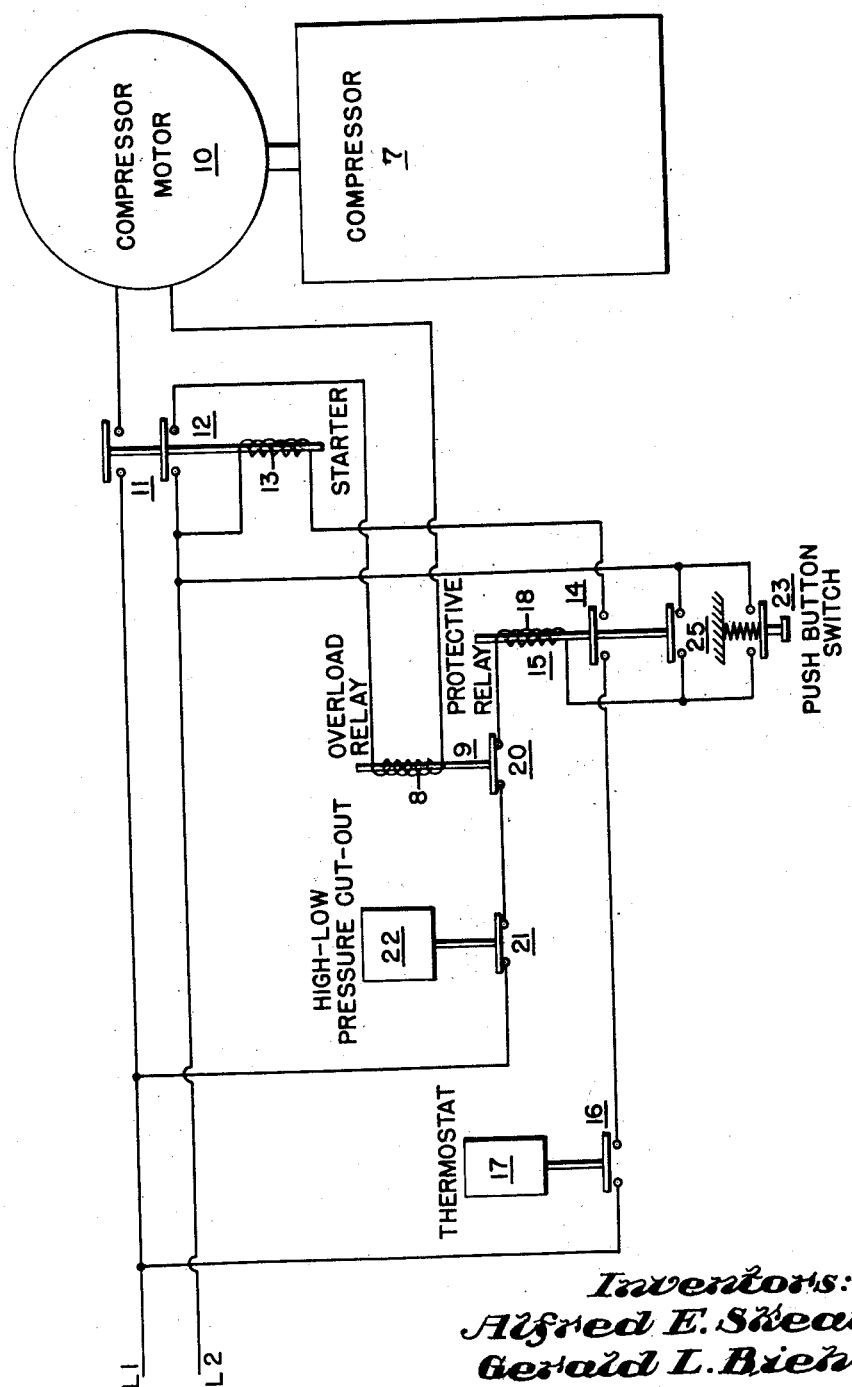

2,818,535

SAFETY CONTROL CIRCUITS FOR ELECTRIC MOTORS

Alfred E. Skeats and Gerald L. Biehn, Staunton, Va., assignors to Westinghouse Electric Corporation, East Pittsburgh, Pa., a corporation of Pennsylvania Application August 1, 1955, Serial No. 525,464

1 Claim. (Cl. 317—13)

This invention relates to safety controls for electric motors, and relates more particularly to safety controls for electric motors for driving refrigerant compressors.

Air conditioning units using motor driven refrigerant compressors, usually have high and low pressure cut-outs, and overload relays. A high pressure cut-out deenergizes a compressor motor as when a temporary failure occurs in the water supply for cooling the associated condenser, or when the water pressure is too low for satisfactory condenser cooling. A low pressure cut-out may deenergize the compressor motor when the unit has operated continuously for a long period of time, when the space served has dropped to a low temperature or humidity or both. Most such units usually have their safety controls within their cabinets so that it is usually necessary to call a service man to open a cabinet and reset a safety control which has operated to stop a compressor motor. This not only involves undesired expense but results in periods of time during which there is no air cooling. Automatic restarting of a compressor motor is not practical for if this were done the unit might operate intermittently without anyone being aware that there was a legitimate reason for the operation of one or more of the safety controls.

The A. W. Courtney, Jr., Patent No. 2,697,195 discloses a satisfactory control for restarting a refrigerant compressor motor after a safety control has operated, using a simple on-off switch which may be mounted on the exterior of a cabinet of an air conditioning unit. To restart a compressor motor using such a control involves no more than the opening followed by the closing of the switch. The control circuit of this patent uses a protective relay having its energizing winding in series with the energizing winding of the magnetic starter for the compressor motor, requiring the energizing winding of the starter to have a higher impedance than that of the protective relay so that the protective relay can be energized without the starter being energized.

The present invention provides a simple, easily accessible switch which may be a push button switch, and a protective relay, for restarting a compressor motor after a safety control has acted as in the Courtney patent, but is an improvement over the control circuit of the patent in that the energizing windings of the protective relay and the motor starter are not connected in series and so do not have to have critically different impedances, and in that a failure of the protective relay as caused by a short-circuit will be a "safe" failure, the contacts of the protective relay opening when such a failure occurs.

An object of this invention is to provide an improved control for restarting an electric motor after a safety control has stopped it.

This invention will now be described with reference to the annexed drawing which is a simplified circuit schematic of one embodiment of the invention.

An electric motor 10 for driving a refrigerant compressor 7 is connected to electric supply lines L1 and L2 through the energizing winding 8 of an overload relay 9, and through the switches 11 of a magnetic motor starter 12. The starter 12 has an energizing winding 13 connected in series with the switch 14 of a protective relay 15, and the switch 16 of a room thermostat 17, to the lines L1 and L2, this circuit extending from L1 through switches 16 and 14, and starter winding 13 to L2.

The protective relay 15 has its energizing winding 18 connected in series with a switch 20 of the overload relay 9, and a switch 21 of a conventional high-low pressure cut-out 22 to L1, and through a push-button switch 23 which normally is spring biased open, to L2. The protective relay 15 has another switch 25 connected across the switch 23. The overload relay 9 and the cut-out 22 are of the automatic resetting type.

*Operation*

Normally, with the unit inactive, the switches 20 and 21 would be closed. The protective relay 15 would be deenergized and its switches 14 and 25 would be open. To start the compressor, the push-button switch 23 would be momentarily closed, connecting one side of the protective relay winding through switch 23 to L2, its other side being connected through the switches 20 and 21 to L1. The relay 15 would then be energized and would close its switches 14 and 25, the switch 25 holding the energizing circuit of winding 18 closed after the push-button 23 is released, and the switch 14 connecting the starter winding to the thermostat switch 16. Then when the thermostat calls for cooling it will close its switch 16 completing the energizing circuit of the starter winding 13, and causing the switch 11 to be closed for starting the motor 10.

If the high-low pressure cut-out 22 opens its switch 21 or the overload relay 9 opens its switch 20, the energizing circuit of the protective relay 15 would be opened causing its switches 20 and 21 to be opened. Opening of the switch 14 would open the energizing circuit of the starter winding 13 causing the motor energizing switch 11 to open, stopping the motor 10. Closing of the switch 16 by the thermostat 17 cannot now restart the compressor since the switch 16 is in series with the now open switch 14.

To restart the compressor motor, an operator would temporarily close the push-button switch again. By this time a temporary abnormal condition which caused a safety control to have operated may have disappeared so that the unit would operate normally. If the abnormal condition has not disappeared the frequent requirement for restarting the compressor motor should indicate that there is something wrong with the equipment so that steps can be taken to remedy the condition.

While one embodiment of this invention has been described for the purpose of illustration, it should be understood that the invention is not limited to the exact apparatus and circuit illustrated, since modifications thereof may be suggested by those skilled in the art, without departure from the essence of the invention.

What we claim as our invention, is:

A control circuit for a motor driving a refrigerant compressor of an air cooling unit, comprising a supply circuit for said motor, a magnetic starter having a switch for connecting said motor to said supply circuit, said starter having an energizing winding, a refrigerant pressure operated cut-out having a first normally closed safety switch, an overload relay having an energizing winding connected in series with said motor and having a second normally closed safety switch, a protective relay having an energizing winding, said protective relay having first and second relay switches, a thermostat having a switch, a first circuit connecting said protective relay winding, said safety switches and said first relay switch in series to said supply circuit, a second circuit connecting said starter winding, said thermostat switch and said second relay switch in series to said supply circuit, and a control switch connected across said first relay switch for completing said first circuit when said first relay switch is open.

References Cited in the file of this patent

UNITED STATES PATENTS

| | | |
|---|---|---|
| 2,050,076 | Wilms | Aug. 4, 1936 |
| 2,438,647 | Ranson | Mar. 30, 1948 |
| 2,602,294 | Sedgwick | July 8, 1952 |
| 2,697,195 | Courtney | Dec. 14, 1954 |